United States Patent
Zellerhoff

(10) Patent No.: US 6,836,482 B1
(45) Date of Patent: Dec. 28, 2004

(54) METHOD OF TRANSMISSION AND TRANSMISSION SYSTEM

(75) Inventor: Thomas Zellerhoff, München (DE)

(73) Assignee: Siemens Aktiengesellschaft, Münich (DE)

( * ) Notice: Subject to any disclaimer, the term of this patent is extended or adjusted under 35 U.S.C. 154(b) by 0 days.

(21) Appl. No.: 09/600,364

(22) PCT Filed: Dec. 16, 1998

(86) PCT No.: PCT/DE98/03696

§ 371 (c)(1),
(2), (4) Date: Jul. 14, 2000

(87) PCT Pub. No.: WO99/38349

PCT Pub. Date: Jul. 29, 1999

(30) Foreign Application Priority Data

Jan. 22, 1998 (DE) .......................................... 198 02 365

(51) Int. Cl.$^7$ .......................... H04B 7/005; H04L 12/56; H04J 3/24
(52) U.S. Cl. .................. 370/395.3; 370/278; 370/395.6; 370/472; 370/476
(58) Field of Search ................................. 370/216, 465, 370/470–471, 509, 514, 516, 520, 395.1, 341, 395.6–395.65, 395.71, 535, 536, 397, 399, 340, 365, 366, 394, 350; 375/364, 365, 368, 371

(56) References Cited

U.S. PATENT DOCUMENTS

| | | | | |
|---|---|---|---|---|
| 5,432,785 A | * | 7/1995 | Ahmed et al. ............... | 370/231 |
| 5,513,178 A | * | 4/1996 | Tanaka ..................... | 370/395.3 |
| 5,566,179 A | * | 10/1996 | Kobayashi et al. ......... | 370/396 |
| 5,579,324 A | * | 11/1996 | Buhrgard ................... | 370/508 |
| 5,619,500 A | * | 4/1997 | Hiekali ..................... | 370/414 |
| 5,757,775 A | * | 5/1998 | Yokoyama et al. ......... | 370/242 |
| 5,768,271 A | * | 6/1998 | Seid et al. ................. | 370/389 |
| 5,905,729 A | * | 5/1999 | Gaddis et al. .............. | 370/399 |
| 5,948,067 A | * | 9/1999 | Caldara et al. ............. | 709/236 |
| 6,175,567 B1 | * | 1/2001 | Yoo ......................... | 370/395.7 |
| 6,301,269 B1 | * | 10/2001 | Tayloe et al. ............... | 370/519 |
| 6,535,527 B1 | * | 3/2003 | Duffy ........................ | 370/509 |
| 6,611,534 B1 | * | 8/2003 | Sogabe et al. ............. | 370/471 |
| 6,618,383 B1 | * | 9/2003 | Tomlins .................... | 370/395.5 |

FOREIGN PATENT DOCUMENTS

| | | |
|---|---|---|
| CH | 682 277 | 8/1993 |
| EP | 0 262 457 | 4/1988 |
| EP | 0 476 444 | 3/1992 |

* cited by examiner

Primary Examiner—Kenneth Vanderpuye
Assistant Examiner—Van Kim T. Nguyen
(74) Attorney, Agent, or Firm—Schiff Hardin LLP

(57) ABSTRACT

Digital data of a specific plurality of data channels ($K_0$–$K_n$) of the input side supplied in parallel form are converted into a serial data stream (D) and are in turn divided into parallel data channels ($K_0$–$K_n$) of the output side upon reception with the assistance of a corresponding demultiplexing. In order to enable the allocation of the bits of the data channels ($K_0$–$K_n$) of the input side read-in in parallel without great circuit-oriented outlay and without additional synchronization information, it is proposed to monitor the serial data stream (D) transmitted in the form of ATM cells for the occurrence of a specific bit sequence that is already transmitted with every cell format. The position of the individual bits of the corresponding data channels ($K_0$ $K_n$) in the serial, optical data stream can be determined on the basis of this characteristic bit sequence, so that a correct parallelization at the data stream (D) at the output side is possible.

16 Claims, 2 Drawing Sheets

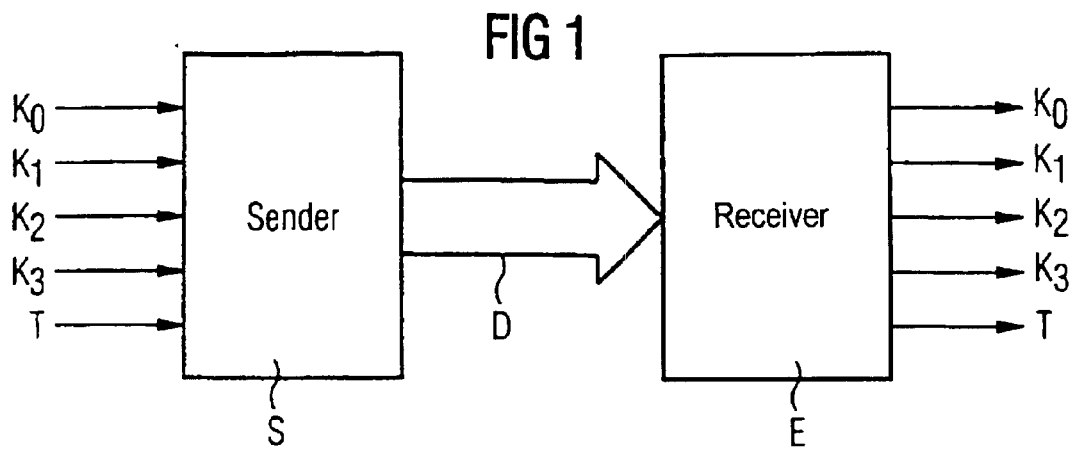
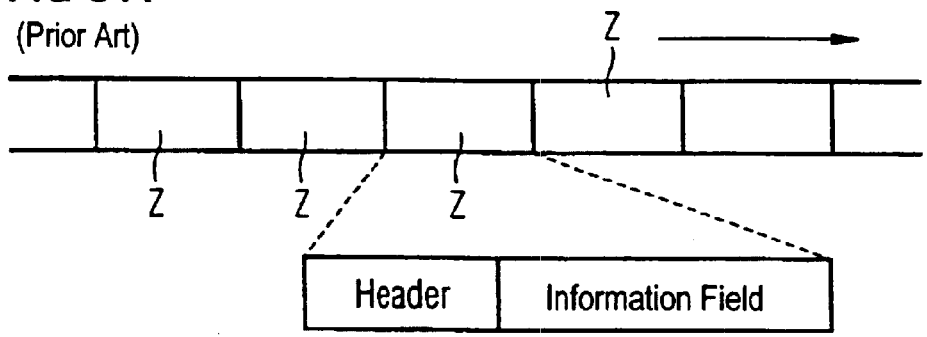
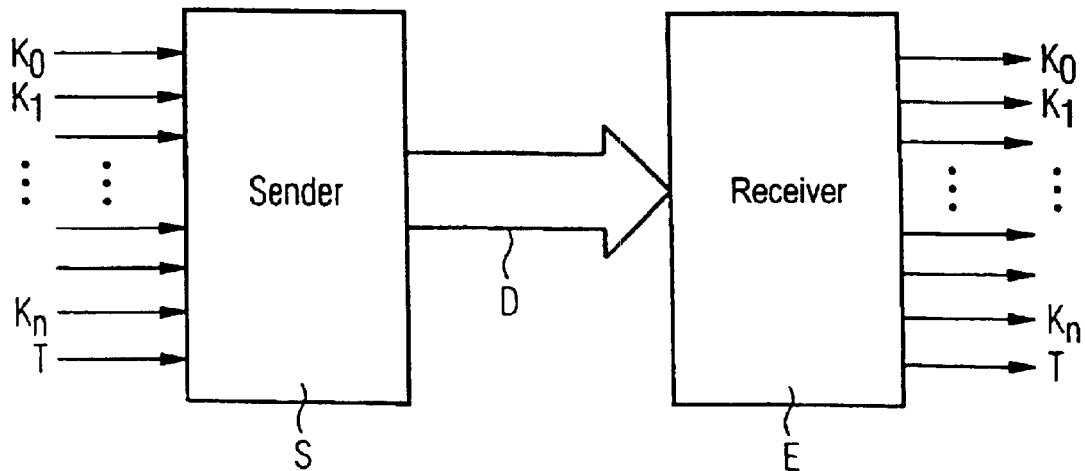

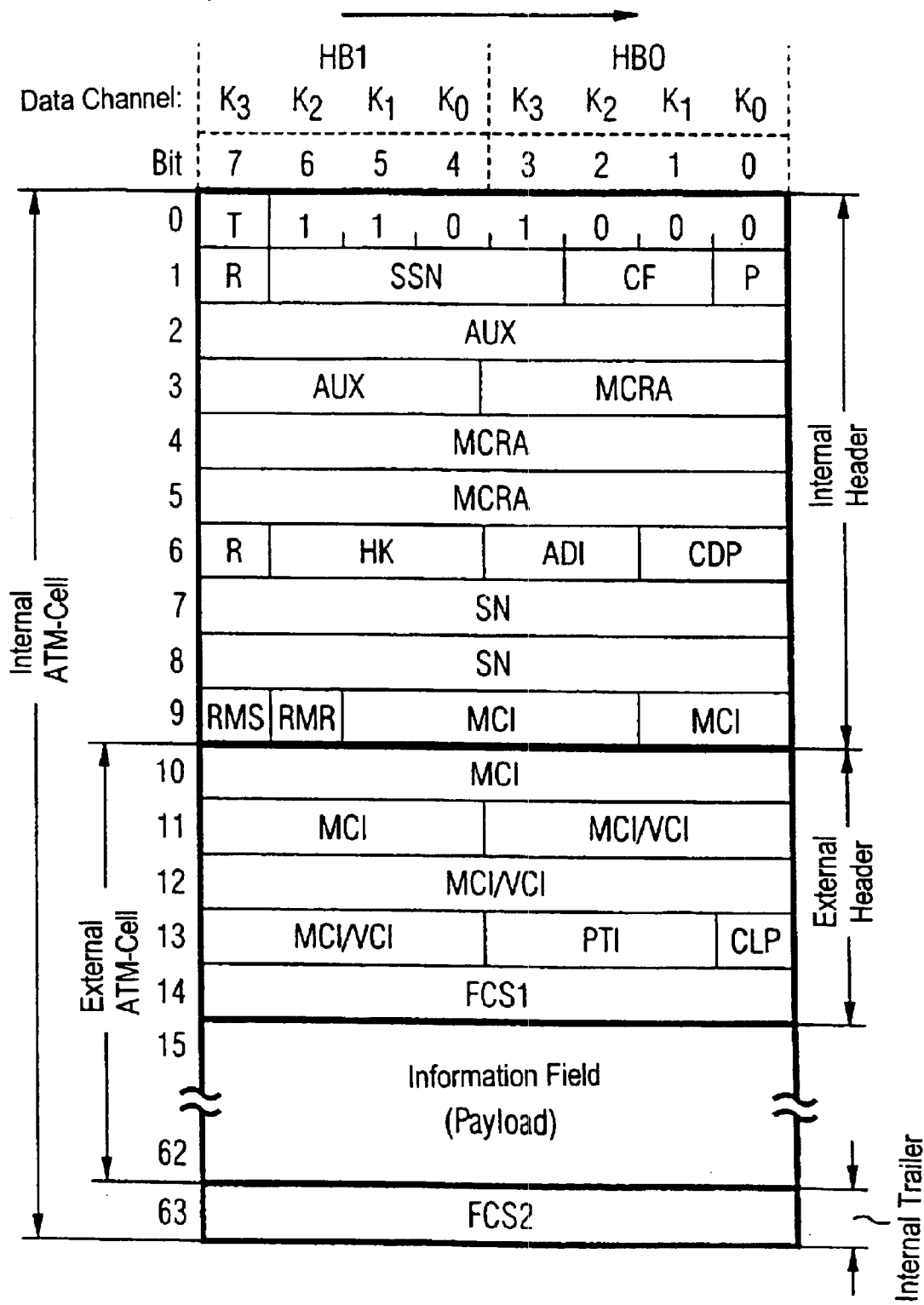

METHOD OF TRANSMISSION AND TRANSMISSION SYSTEM

FIELD OF THE INVENTION

The present invention is directed to a method for the transmission of data in an ATM transmission system as well as to an ATM transmission system, particularly an ATM broadband transmission system.

DESCRIPTION OF THE RELATED ART

Many new transmission or switching principles for various types of transmission in communication networks have been developed during the course of the rapid development of communications technology in recent years. The STM transmission principle (synchronous transfer mode) deals with a synchronous transfer or transmission method, in which the data of various data channels are serially transmitted within different time slots, and the individual time slots are combined into frames. A frame synchronization word is transmitted for the synchronization of each and every frame, so that each time slot of a frame allocated to a specific date channel exhibits a fixed time spacing from the frame synchronization word. Each time slot can contain a relatively small number of bits, for example 8 bits, and appears at constant time intervals. However, highly different bit rates cannot be uniformly governed with the assistance of this STM principle, i.e., different communication networks for different bit rate ranges would have to be provided given application of the STM principle, particularly given the currently desired broadband signal transmission. A uniform digital broadband communication network (broadband integrated services digital network, BISDN) cannot be realized with the assistance of the STM principle.

The ATM transmission or switching principle (asynchronous transfer mode) is significantly more flexible compared to the STM transmission principle. According to this ATM principle, calls that contain 63 octets or bytes as payload information as a standard are transmitted instead of the time slots of the STM principle. These ATM cells are transmitted with a constant transmission rate dependent on the band width of the transmission medium. Dummy cells are used when no messages are to be transmitted. A "header", which contains the control or address information for the corresponding cell, is attached to the information field of every cell, which contains the actual payload information.

FIG. 3a shows an illustration for explaining the ATM principle. As shown in FIG. 3a, a plurality of cells Z are successively transmitted (in the direction indicated by the arrow) from a sender to a receiver. Each cell comprises a header with address or control information as well as an information field with the actual payload information. According to the defined standard, the information field comprises 48 octets, and the header comprises 5 octets, so that each cell is formed by 53 octets or bytes. Additional (header) octets can be attached to this cell format, which are capable of being employed for the routing of the cell upon transmission of the cell from a sending subscriber to a receiving subscriber.

In newer ATM broadband transmission systems or communication networks, the data streams between the individual transmission and reception assemblies are optically transmitted via light waveguides. These ATM broadband communication networks allow an extremely high data throughput that cannot—due to technological limitations—be processed by the switching elements that are thereby employed and that are usually fashioned in CMOS technology. To address this problem, the data to be transmitted are therefore supplied in parallel to transmission modules via a plurality of data lines and transmitted by the transmission modules serially multiplex via the light waveguides to reception modules, which in turn divide the serial ATM data stream onto corresponding, parallel data channels at the output side for further processing.

This principle is shown in FIG. 3b. An optical ATM link serving as transmitter receives digital data of a plurality of data channels $K_0-K_n$. Further, the sender S is supplied with a clock signal T. Dependent on the clock signal T, the sender S thus respectively reads n+1 bits in in parallel, and converts these bits into a serial, multiplexed ATM data stream D having a correspondingly higher data transmission rate, and this data stream D is optically transmitted to a receiver E. This receiver E parallelizes the received, serial data streams D, and in turn outputs it in parallel via date channel lines $K_0-K_n$ of the output side together with a clock signal T.

It is apparent on the basis of the above description that the demultiplexing of the serial data stream D in the receiver E represents a specific problem. For demultiplexing the data stream D, the receiver E must known which bit of the serial data stream D is to be allocated to which data channel $K_0-K_n$ of the output side. For this purpose, known solutions provide that additional synchronization information be attached to the actual serial data stream D at the transmission side, these additional synchronization information being interpreted in the receiver E and defining the allocation of the digital information transmitted in the serial data stream D to the individual data channels $K_0-K_n$ of the output side. Thus, for example, additional synchronization information can be attached with the assistance of an encoding implemented in the sender S, particularly a block encoding. As a result of the block encoding in the sender S, a redundancy is attached to the actual serial data stream D, as a result of which the serial data rate of the data stream D rises. On the other hand, a relatively high circuit outlay is required in the receiver E in order to be able to interpret the synchronization information attached to the serial data stream D. This all results in, for example, no inexpensive standard lasers can be utilized for the transmission of the data of the input-side data channels $K_0-K_n$.

An example for the demultiplexing of a serial data stream is disclosed in U.S. Pat. No. 5,579,324, in which the arriving bit stream is synchronized by a control block, resulting in a significant outlay in the demultiplexing at the reception side.

Furthermore, Swiss Letters Patent 682 277 discloses methods for the synchronization of a serial ATM bit stream, which particularly addresses how the cell boundaries of a serial ATM bit stream can be identified. However, how a demultiplexing of a serially transmitted data stream is to be efficiently undertaken at the reception side is not addressed in this reference.

SUMMARY OF THE INVENTION

The present invention is therefore based on the object of creating a transmission method for an ATM transmission system as well as a corresponding ATM transmission system, in which a receiver-side demultiplexing of the serially transmitted data stream is possible with the relatively simple circuit-oriented outlay. In particular, a correct demultiplexing of the serial data stream should be possible without attaching additional synchronization information and, thus, without attaching redundancy.

According to the present invention, this object is achieved by a method for the transmission of data in an ATM transmission system, comprising the steps of supplying digital data of a specific plurality of data channels parallel to an input side of a sender, converting the digital data into data units that respectively comprise an identical plurality of bits from each of the data channels, serially transmitting individual the data units in a form of cells that are respectively composed of a specific plurality of the data units, each cell having a specific, characteristic bit sequence, receiving, by a receiver the serially transmitted data units, monitoring, by the receiver, the received data units for an occurrence of the characteristic bit sequence and, after identifying the characteristic bit sequence, identifying a first data unit of a cell corresponding to the characteristic bit sequence, successively dividing, beginning with the first data unit of the cell corresponding to the characteristic bit sequence, individual bits of each the data unit of the corresponding cell onto a plurality of parallel data channels of an output side of the receiver corresponding in number to the plurality of data channels of the input side of the sender and the bits of each the data unit are output parallel via corresponding the data channels of the output side.

This object is also achieved by an ATM transmission system comprising a sender that converts digital data of a specific plurality of data channels supplied to it at an input side into data units such that each data unit comprises an identical plurality of bits from each the data channel, and serially transmits individual the data units via a transmission medium in a form of cells, each the cell comprising a specific plurality of data units, each the cell respectively comprising comprises a specific, characteristic bit sequence, a receiver that receives the serially transmitted data units from the sender and monitors the data units for an occurrence of the characteristic bit sequence, the receiver, after detecting the characteristic bit sequence in the serially transmitted data units, determines a first data unit of the cell corresponding to the characteristic bit sequence and, beginning with the first data unit, successively divides individual the bits of each the data unit of a corresponding cell onto a plurality of parallel data channels of an output side corresponding in number to the plurality of data channels of the input side and outputs the individual the bits of each the data unit in parallel.

According to the present invention and in agreement with the Related Art, the digital data of the parallel data channels present at the transmission side continue to be converted bit-by-bit into a serial ATM data stream, i.e., continue to be multiplexed, where the serial data of the ATM data stream are transmitted in the form of the initially described ATM cells. According to the present invention, however, a characteristic bit sequence with whose assistance the beginning of the corresponding ATM cell in the serial data stream can be acquired at the receiver side is transmitted within each cell. This characteristic bit sequence is preferably a matter of a synchronous octet that is already transmitted with every ATM cell, so that the beginning of the corresponding ATM cell can be recognized by monitoring the received data stream for the appearance of thin synchronous octet, and, thus, the information of the serial data stream can be correctly parallelized and divided onto corresponding data channels of the output side.

To this end, the digital data of the data channels supplied parallel at the input side are combined bit-by-bit into data units that form the ATM cells to be respectively transmitted. Each ATM cell transmitted with the assistance of the serial data stream thus contains a plurality of data units that respectively comprise an identical plurality of bits of each and every parallel data channel. It is fundamentally conceivable that two or more bits are transmitted with each data unit from each data channel. In practice, however, the parallel data channels adjacent at the input side are sampled bit-by-bit, so that each data unit of each data channel comprises only one bit. The corresponding bit of a data channel is always situated at the same location within each data unit, so that the individual bits can be easily divided onto the parallel, output-side data channels at the reception side after identification of the beginning of a data unit. The employment of respectively four data channels of the input side and output side is especially advantageous since the data of the data channels can be combined into half-bytes in four-bit fashion, by which each half-byte forms an above-described data unit of the ATM cell to be transmitted. Each octet of an ATM cell, accordingly, comprises two of these half-bytes. The data of each ATM cell are thus serially transmitted from the transmitter to the receiver in half-byte fashion.

The inventively proposed evaluation of the characteristic bit sequence of the cell, which is already transmitted with the cell and is usually formed by the first byte of each ATM cell, thus makes it possible that no additional signals or synchronization information for the channel allocation are required for the demultiplexing of the receiver side. An increase in the data rate of the optically transmitted, serial data stream together with the above-described associated disadvantages connected can thus be avoided. The invention thus enables a data transmission according to the ATM transmission principle with relatively little circuit outlay and allows the employment of smaller module sizes for the transmitter or receiver modules. Furthermore, the transmission is possible with a lower dissipated power, and the costs can be reduced as a result of the lower circuit outlay.

The invention is particularly directed to the transmission of data within an ATM switching system.

BRIEF DESCRIPTION OF THE DRAWINGS

The invention is explained in greater detail below with reference to the attached drawing on the basis of a preferred exemplary embodiment.

FIG. 1 is a schematic illustration of a preferred exemplary embodiment of the inventive ATM broadband transmission system;

FIG. 2 is a data structure diagram showing the internal structure of an ATM cell that is transmitted from a sender to a receiver via the serial data flow shown in FIG. 1;

FIG. 3a is a flow diagram illustrating an illustration of the basic data flow according to the ATM transmission principle; and FIG. 3b is a flow diagram illustrating a schematic illustration of a known ATM broadband transmission system.

DESCRIPTION OF THE PREFERRED EMBODIMENTS

FIG. 1 schematically shows the structure of a preferred exemplary embodiment of the inventive ATM transmission system. Viewed from the outside, this structure essentially corresponds to the known structure shown in FIG. 3B. A sender/transmitter S receives a plurality of data channels $K_0$–$K_3$ as well as a clock signal T and converts the digital data of these data channels pending at it in parallel into a serial data stream D that is composed of a plurality of successively transmitted ATM cells. This serial data stream D is received by a receiver E and interpreted and allocated at the output side to the data channels $K_0$–$K_3$ of the output side. A special characteristic of the exemplary embodiment shown in FIG. 1, however, is the fact that the sender S is supplied with four data channels $K_0$–$K_3$ whose digital data are acquired parallel in four-bit fashion and converted into the serial data stream, i.e. multiplexed. The sender S optically transmits the serial data stream to the receiver E via a light waveguide arrangement. The individual data channels $K_0$–$K_3$ can, for example, exhibit a transmission rate of 830 Mbit/s, whereas the serial ATM data stream is optically transmitted with a corresponding data rate of 3.3 Gbit/s.

The parallel reed-in of the digital data of the four data channels $K_0$–$K_3$ in four-bit fashion is particularly advantageous—as shall be explained in greater detail later—because the four bits of the individual data channels $K_0$–$K_2$ read-in in parallel can be combined especially easily in the sender S to form date units in the form of half-bytes that are transmitted from the sender S to the receiver E in the form of ATM cells. According to the exemplary embodiment shown in FIG. 1, each ATM cell of the series in a data stream D to be transmitted accordingly comprises a plurality of serially transmitted half-bytes that each respectively comprise a bit read-in in parallel from each data channel $K_0$–$K_3$.

The structure of the ATM cells of the serial data stream D transmitted from the sender S to the receiver E is explained in greater detail below with reference to FIG. 2. This is thereby a matter of a preferred example of a cell format employed by the assignee for a multicast mode. Of course, other ATM cell formats are also possible.

The ATM cell shown in FIG. 2 comprises the standardized ATM cell structure as initially already set forth with 53 octets or bytes, which are formed by the octets Nos. 10–62 in FIG. 2. This standardized cell structure is referenced "external ATM cell" in FIG. 2 and comprises, first, an "external" header as well as the previously mentioned information field in which the actual payload information is contained. The "external" header comprises 5 octets, and the information field comprises 48 octets.

According to FIG. 2, the sender S shown in FIG. 1 attaches additional address or control octets that comprise internal routing information for the transmission of the ATM cells between the individual switching modules to this standardized ATM cell structure having 5 header octets and 48 information field octets. According to FIG. 2, these internal address or, respectively, control information comprises an "internal" header with an additional 10 octets as well as an "internal" trailer with one octet that terminates the ATM cell, so that the ATM cells to be transmitted overall from the transmitter S to the receiver E comprise a total of 64 octets or bytes. As has already been explained on the basis of FIG. 3, it is fundamentally known to attach additional address or control octets with routing information for the transmission to the 53 octets prescribed according to the standard.

Inventively, however, it is now proposed that a characteristic bit sequence that can be unambiguously identified within each ATM cell at the reception side be transmitted within the ATM cell. The receiver monitor the serial data stream provided to it for the occurrence of this characteristic bit sequence and, after recognizing this characteristic bit sequence, can identify and determine the start of the corresponding ATM cell within the serially transmitted data stream. This is particularly possible according to the present invention because the bits of the digital data channels $K_0$–$K_3$ read-in in parallel at the transmission side (see FIG. 1) are combined into data units, each of which comprises an identical plurality of bits from each data channel. The bits of each data channel always have the same position within the individual data units, so that—after identifying the characteristic bit sequence in the receiver—the beginning of the first data unit of the corresponding ATM cell, i.e., the position of the individual data units in the serial optical data stream, can be determined, and the individual bits of the individual data units can be correctly divided onto the individual data channels $K_0$–$K_3$ at the output side.

It would be fundamentally possible that the individual, serially transmitted data units of each ATM cell comprise two or more bits from each data channel $K_0$–$K_3$, in which, for example, the bits 0 and 1 are allocated to the data channel $K_0$, the bits 2 and 3 are allocated to the data channel $K_1$, etc. In this case, the data units to be transmitted would be respectively formed by a full byte, by which each ATM cell would be correspondingly transmitted byte-by-byte from the transmitter to the receiver.

However, it is advantageous to respectively read only one bit in in parallel from each data channel $K_0$–$K_3$ at the transmission side dependent on the supplied clock signal T (see FIG. 1) and to multiplex them, so that the data units of the serial data stream transmitted from the transmitter/sender S shown in FIG. 1 to the receiver E are respectively formed by haft-bytes with four bits, where 128 serially transmitted half-bytes form an ATM cell of the serial data stream D according to FIG. 2. In other words, this means that each octet of the ATM cell shown in FIG. 2 is preferably transmitted from the transmitter/sender S to the receiver E in half-bytes by transmission of a half-byte HB0 and of a following, second half-byte HB1. The arrow shown in FIG. 2 corresponds to the transmission sequence of the individual half bytes HB0 and HB1.

In order for the bits contained in the individual half-bytes to be correctly acquired at the receiver side and divided onto the data channels $K_0$–$K_3$ of the output side, the receiver E must determine, first, the respective beginning of the individual ATM cells and, second, the beginning of every half-byte within each ATM cell in the data stream D having successively transmitted half-bytes that is supplied to it.

A characteristic bit sequence that in monitored for occurrence at the receiver side is transmitted within each ATM cell for this purpose. This characteristic bit sequence is always transmitted at the same location in each of the transmitted ATM cells, i.e. in the same octet and divided onto the same haft-bytes. When, thus, the receiver recognizes the occurrence of this characteristic bit sequence in the serial data stream D supplied to it, the receiver can—since it knows the relationship between the position of the characteristic bit sequence within the ATM cell and the beginning of the ATM cell, i.e., the position of the ATM cell within the serial data stream—determine the beginning of the corresponding ATM cells and, thus, the first half-byte of this ATM cell in the serial data stream and can correctly divide the individual bits of this first half-byte as well as of the following half-bytes of the corresponding ATM cell successively onto the individual data channels $K_0$–$K_3$ of the output side, so that these are output correspondingly parallel.

Due to the fact that a bit sequence that is already contained and transmitted in the ATM cell format shown in FIG. 2 is employed as characteristic bit sequence of each ATM cell, no additional data outlay arises for the receive-side synchronization, i.e., allocation of the individual bits of the serial data stream to the corresponding data channels $K_0$–$K_3$ of the output side, i.e., no additional synchronization information need be attached to the actual serial data stream D to be transmitted, so that no redundancy occurs.

Advantageously, the first octet of each and every ATM cell can be employed as the above described, characteristic bit sequence. Given employment of the cell format shown in FIG. 2, this octet 0 shown in FIG. 2 is required in standardized fashion in the ATM broadband transmission systems shown in FIGS. 1 and 3 for the interpretation and determination of the corresponding ATM cell in the individual switching modules (transmitter, receiver) and is referred to a synchronous octet. This synchronous octet comprises bits consecutively numbered with 0 through 6 in FIG. 2 that have the same value for each ATM cell to be transmitted and are thus fixed. The most significant bit 7 of this synchronous octet, which is referenced T in FIG. 2, is a toggle bit that the transmitter sets in alternation from ATM cell to ATM cell. Advantageously, this synchronous octet already transmitted with the ATM cell format shown in FIG. 2 is employed as characteristic bit sequence whose occurrence in the serial data stream is monitored by the receiver. As soon as the receiver E shown in FIG. 1 has recognized the occurrence of this bit sequence of the synchronous octet in the serial data stream D, it presumes that this is the beginning of a new ATM cell that comprises 64 octets overall, including the synchronous octet, so that the receiver E can interpret the individual octets of the corresponding ATM cell transmitted by half-bytes. As shown in FIG. 2, of course, the synchronous octet is also transmitted by half-bytes according to the preferred exemplary embodiment, i.e., the four leas significant bits 0–3 of the synchronous octet are serially transmitted within a first half-byte HB0 and the four more significant bits 4–7 are serially transmitted in a following half-byte HB1.

The relationship of the bits combined in the half-bytes HB0 or, respectively, HB1 and the corresponding data channels is also shown in FIG. 2. The individual octets 0–63 of every ATM cell are transmitted from the transmitter to the receiver by half-bytes on the basis of the successive transmission of a first half-byte HB0 and of a second half-byte HB1. Each of these half-bytes HB0, HB1 comprises four bits read in in parallel from the data channels $K_0$–$K_3$ adjacent at the transmitter S (see FIG. 1) A bit position is allocated to a fixed data channel within each half-byte HB0, HB1. According to FIG. 2, for example, the bit 0 of each half-byte HB0 or HB1 thus always corresponds to the data channel $K_0$, whereas, for example, the bit 2 corresponds to the data channel $K_2$. The receiver E can thus simply demultiplex the serial bit sequence supplied to it, since, after recognizing the occurrence of the synchronous octet in the serial data stream, it knows the beginning of the first half-byte of the corresponding ATM cell, so that—according to the allocation shown in FIG. 2—it must simply successively distribute respectively one bit onto the data channels $K_0$ $K_3$ of the output side so that the parallel data channels adjacent at the input side again appear correctly at the output of the receiver.

The function of the individual component parts of the ATM cell format shown in FIG. 2 shall be briefly explained below by way of addition.

As has already been explained, the "internal" header attached to the standardized ("external") ATM cell format having a total of 53 octets comprises a total of 10 octets, 0–9. The individual octets of this "internal" header comprise routing information for the transmission of the corresponding ATM cells. Some bits R that are currently not yet used and are thus reserved, are present within this internal header. The bits referenced SSN (switching state number) serve the purpose of designationally transmitting the corresponding ATM cell to a specific switching element. For example, a specific switching element can thus recognize on the basis of the information of this SSN bit field whether the respective ATM cell is intended for the corresponding switching element. The bits referenced CF define the currently still unused flag (congestion flag). Furthermore, the internal header contains a parity bit P for a parity check of the routing information contained in the internal header. AUX references auxiliary bits. The bits MCRA reference the internal routing address of the corresponding ATM cell (multicast routing address). The bits HK (housekeeping) serve for the classification of the cell (dummy cell, etc.). The bits ADI (address identifier) serve for defining addresses for a physical multicast mode in the individual switching elements. Delay priorities can be defined for the individual ATM cells with the assistance of the bits CDP (cell delay priority). The octets of the internal header referenced SN (sequence number) serve for consecutive numbering of the individual, serially transmitted ATM cells. The bits referenced RMS (redundant module sender) and RMR (redundant module receiver) are special bits for a farther-reaching redundancy classification of the individual ATM cells. This is especially meaningful because all ATM cells are fundamentally transmitted twice for security reasons.

The internal trailer that is likewise attached to the standardized cell format (octet 10–62) at the end comprises a checkbit sequence referenced FCS2 (frame check sequence) for the payload information transmitted in the information field.

The structure of the "external" header with the standardized 5 octets 10–14 is notoriously known, and will not be discussed further here. In general, this external header contains address information MCI (multicast connection identifier) and VCI (virtual channel identifier). Furthermore, the type of payload transmitted in the information field is referenced PTI (payload type identification) and the corresponding ATM cell has a specific cell priority (CLP, cell loss priority) allocated to it. Finally, the external header contains a tuner check octet (FCS1, frame check sequence) that serves for checking both the external header (octet 10–14) as well as the octets 2–9 of the internal header.

The above-described method is illustrative of the principles of the present invention. Numerous modifications and adaptions thereof will be readily apparent to those skilled in this art without departing from the spirit and scope of the present invention.

What is claimed is:

1. A method for the transmission of data in an ATM transmission system, comprising the steps of:

supplying digital data of a specific plurality of data channels parallel to an input side of a sender;

converting said digital data into data units that respectively comprise an identical plurality of bits from each of said data channels;

serially transmitting individual said data units in a form of cells that are respectively composed of a specific plurality of said data units, each cell having a specific, characteristic bit sequence;

receiving, by a receiver said serially transmitted data units;

monitoring, by said receiver, said received data units for an occurrence of said characteristic bit sequence and, after identifying said characteristic bit sequence, identifying a first data unit of a cell corresponding to said characteristic bit sequence; and successively dividing, beginning with said first data unit of said cell corresponding to said characteristic bit sequence, individual bits of each said data unit of said corresponding cell onto a plurality of parallel data channels of an output side of said receiver corresponding in number to said plurality of data channels of said input side of said sender and said bits of each said data unit are output parallel via corresponding said data channels of said output side, wherein all bits other than said most-significant bit of said characteristic bit sequence are the same for each cell.

2. A method according to claim 1, wherein said characteristic bit sequence transmitted within each cell comprises 8 bits.

3. A method according to claim 2, further comprising the step of setting, in alternation from cell to cell, the most-significant bit of said characteristic bit sequence before said step of transmitting said characteristic bit sequence.

4. A method according to claim 1, wherein said plurality of parallel data channels of said input side is four, said digital data being synchronously supplied to said four data channels of said input side in parallel form in said step of supplying digital data.

5. A method according to claim 4, wherein each said data unit that is transmitted in said step of serially transmitting individual said data units comprises one synchronously read-in bit from each said data channel said synchronously read-in bit of a specific data channel being arranged at a same location in every said data unit.

6. A method according to claim 4, wherein said step of serially transmitting individual said data units comprises transmitting said characteristic bit sequence in two successive data units with respectively four bits in each said successive data unit.

7. A method according to claim 1, wherein said step of serially transmitting individual said data units transmits said characteristic bit sequence before a first data unit of a corresponding cell that comprises bits of said data channels of said input side.

8. A method according to claim 1, wherein said step of serially transmitting said individual data units comprises transmitting said individual data units via an optical transmission medium.

9. A method according to claim 1, wherein:
said step of converting said digital data into data units is performed by clocking said digital data of said individual, parallel data channels of said input side to be serially transmitted; and
said step of successively dividing individual bits of every serially transmitted data unit is performed by clocking said individual bits onto said individual, parallel data channels of said output side and are output.

10. A method according to claim 1, wherein each said cell, including said characteristic bit sequence, comprises 64 bytes that are transmitted in 128 data units with respectively four bits in said step of transmitting individual said data units.

11. A method according to claim 1, wherein each said cell encompasses a first group of data units that comprise control information and a second group of data units that comprise payload information, said first group comprising said characteristic bit sequence for said corresponding cell.

12. A method according to claim 10, wherein said first group comprises 16 bytes and said second group comprises 48 bytes.

13. An ATM transmission system, comprising:
a sender that converts digital data of a specific plurality of data channels supplied to it at an input side into data units such that each data unit comprises an identical plurality of bits from each said data channel, and serially transmits individual said data units via a transmission medium in a form of cells, each said cell comprising a specific plurality of data units, each said cell respectively comprising comprises a specific, characteristic bit sequence;
a receiver that receives said serially transmitted data units from said sender and monitors said data units for an occurrence of said characteristic bit sequence, said receiver, after detecting said characteristic bit sequence in said serially transmitted data units, determines a first data unit of the cell corresponding to said characteristic bit sequence and, beginning with said first data unit, successively divides individual said bits of each said data unit of a corresponding cell onto a plurality of parallel data channels of an output side corresponding in number to said plurality of data channels of said input side and outputs said individual said bits of each said data unit in parallel, wherein all bits other than said most-significant bit of said characteristic bit sequence are the same for each cell.

14. An ATM transmission system according to claim 13, wherein said sender sends said digital data of said parallel data channels supplied to said sender, to said receiver according to the method for the transmission of data in said ATM transmission system, comprising the steps of:
supplying digital data of a specific plurality of data channels parallel to an input side of a sender;
converting said digital data into data units that respectively comprise an identical plurality of bits from each of said data channels; serially transmitting individual said data units in a form of cells that are respectively composed of a specific plurality of said data units, each cell having a specific, characteristic bit sequence;
receiving, by a receiver said serially transmitted data units;
monitoring, by said receiver, said received data units for an occurrence of said characteristic bit sequence and, after identifying said characteristic bit sequence, identifying a first data unit of a cell corresponding to said characteristic bit sequence; and
successively dividing, beginning with said first data unit of said cell corresponding to said characteristic bit sequence, individual bits of each said data unit of said corresponding cell onto a plurality of parallel data channels of an output side of said receiver corresponding in number to said plurality of data channels of said input side of said sender and said bits of each said data unit are output parallel via corresponding said data channels of said output side, wherein all bits other than said most-significant bit of said characteristic bit sequence are the same for each cell, and are output at said receiver via said parallel data channels of said output side.

15. An ATM transmission system according to claim 13, wherein:
said parallel data channels supplied to said sender utilize a data transmission rate of approximately 830 Mbit/s; and
said transmission medium being an optical medium capable of transmitting data serially with a data rate of approximately 3.3 Gbit/s.

16. A method according to claim 11, wherein said first group comprises 16 bytes and said second group comprises 48 bytes.

* * * * *